Figure 1:
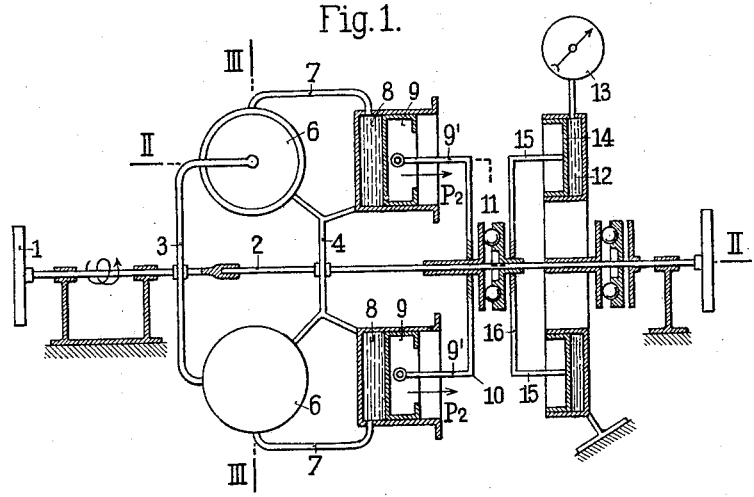

Aug. 2, 1932.  F. SEEWALD ET AL  1,869,513
TORQUE MEASURING INSTRUMENT
Filed Aug. 8, 1929  2 Sheets-Sheet 1

INVENTOR:
F. Seewald &
H. Ebert
By Marks & Clerk
Attys.

Aug. 2, 1932.  F. SEEWALD ET AL  1,869,513
TORQUE MEASURING INSTRUMENT
Filed Aug. 8, 1929   2 Sheets-Sheet 2

INVENTOR:
F. Seewald &
H. Ebert

Patented Aug. 2, 1932

1,869,513

UNITED STATES PATENT OFFICE

FRITZ SEEWALD, OF BERLIN-JOHANNISTHAL, AND HEINRICH EBERT, OF BERLIN-ADLERSHOF, GERMANY, ASSIGNORS TO THE FIRM DEUTSCHE VERSUCHSANSTALT FUR LUFTFAHRT, E. V., OF BERLIN-ADLERSHOF, GERMANY

TORQUE-MEASURING INSTRUMENT

Application filed August 8, 1929, Serial No. 384,375, and in Germany August 4, 1928.

Our invention relates to torque-measuring instruments.

It is an object of our invention to provide an instrument of the kind described which will fulfill the most exacting requirements as to accuracy, particularly in high-speed mechanisms.

To this end we design our instrument as a hydraulic clutch having a driving and a driven shaft, and two sets of liquid cylinders. The cylinders of one set are arranged tangentially with respect to the axis of the shafts and will be referred to as the "tangential" cylinders, and the cylinders of the other set are arranged in parallel to the axis and will be referred to as the "parallel" cylinders. The torque exerted on one of the shafts is transmitted to the pistons of the tangential cylinders which are connected with the parallel cylinders by suitable piping. The pressure in the tangential cylinders is translated into pressure in the parallel cylinders and this pressure is measured by a suitable gauge.

The principle of the instrument is translating tangential forces into forces parallel to the axis by hydraulic means.

This is advantageous because no appreciable forces at right angles to the stroke of the pistons will be set up, and this eliminates friction and the lack of accuracy it involves, as in the known mechanism in which translation is effected by a screw thread.

Our instrument is distinguished from existing hydraulic measuring instruments in principle by the fact that the liquid in the tangential cylinders merely serves for translation into forces in parallel to the axis while in the existing instruments its serves directly for measuring.

Another novel feature of our invention is the elimination of centrifugal action on the liquid by very simple means as will be described. Centrifugal action brings about an additional distribution of pressures in the cylinders which increases with the square of the distance from the axis, and with the square of the number of revs., so that the pressures at the pistons are influenced. In other words, in existing hydraulic instruments the values read at the gauge will vary for the same torque, as the number of revs. varies.

In the drawings affixed to this specification and forming part thereof an instrument embodying our invention is illustrated diagrammatically by way of example.

In the drawings

Figure 2:
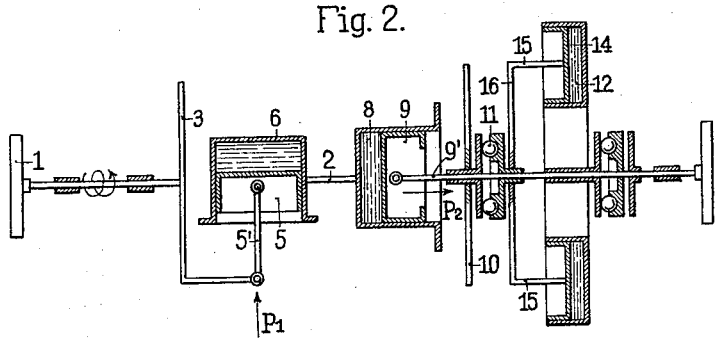
Figure 3:
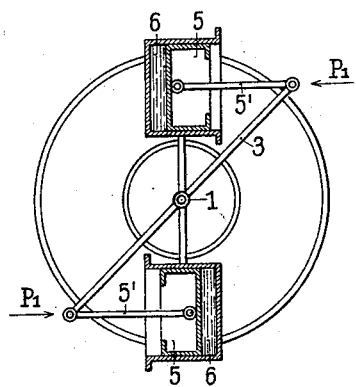

Fig. 1 is a partly sectional elevation of the instrument,

Figs. 2 and 3 are sections on lines 2—2 and 3—3 in Fig. 1, respectively, and

Figures 4, 5, 6:
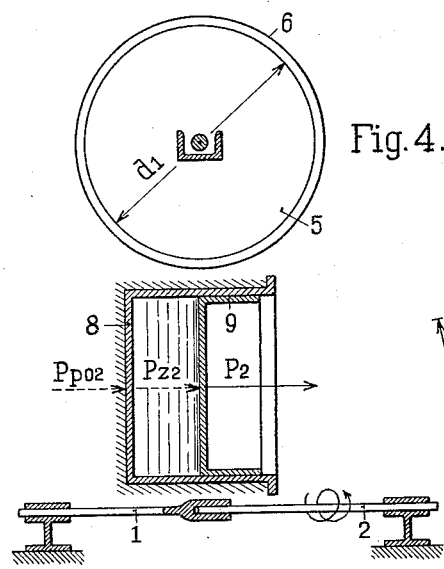

Figs. 4 to 6 are diagrams of forces.

Referring now to the drawings, and first to Figs. 1 to 3, 1 is the driving, and 2 is the driven shaft, 3 is an arm on the driving shaft, 4 is a bracket on the driven shaft, 6 are the tangential, and 8 are the parallel cylinders, both secured on the bracket 4, and 7 are pipes connecting the cylinders of the two sets. We have shown only two cylinders in each set but it is understood that any number of cylinders may be provided.

5 are pistons in the cylinders 6, and 9 are pistons in the cylinders 8. The piston rods 5' of the tangential cylinders 6 are connected to the ends of the arm 3, and the piston rods 9' of the parallel cylinders are connected to a slide 10 on the shaft 2. 11 is a thrust ball bearing at the centre of the slide, and 12 is a liquid container with a pressure gauge 13. The container is stationary and equipped with pistons 14 which are connected with a traverse 16 by rods 15. The thrust of the slide 10 is transmitted to the bracket or traverse 16 by the ball bearing 11.

The torque on the shaft 1 transmits to the tangential pistons 5 tangential forces P1 which generate forces P2 in parallel to the axis of the shafts in the cylinders 8. These forces which are proportional to the tangential forces, are transmitted to the pistons 9 and to the gauge 13 by the mechanism described.

Figs. 4 and 5 illustrate the elimination of centrifugal action. A tangential cylinder 6 and a parallel cylinder 8, with their pistons, are illustrated in these figures which are sections taken at right angles to each other. For the sake of convenience, the parallel cylinder 8 has been shown below the cylinder 6.

$d_1$ and $d_2$ are the diameters of the pistons 6 and 9, respectively, $F_1$ and $F_2$ are the areas of the respective pistons, $R_1$ and $R_2$ are the radial distances of the cylinders 6 and 8, respectively, from the axis of the shafts 1 and 2, $p_0$ is the pressure in the cylinders, and $n$ is the number of revs. per min.

The condition for an accurate measuring of the torque at any number of revs. is that the ratio of $P_1$ and $P_2$ should be a constant, $c_1$. This is not so in the existing instruments, for the reasons stated, but according to our invention the problem is solved by allotting to the radial distance $R_1$ a definite distance $R_2$.

When $n=0$, the pressure $p_0$ exists in both cylinders, and $$\frac{P_1}{P_2} = \frac{p_o F_1}{p_o F_2} = c_1.$$

It may be stated, that fundamentally the small letter $p$ in the formula indicates the specific pressures or the pressure per square cubicmeter area. The capital letter $P$ denotes the forces which act on the entire piston surfaces, or in other words, pressure times area.

Consequently, $$(P_{po})1 \; (P_{po})2 \; (P_{pz})1 \; (P_{pz})2$$

are the forces on the pistons.

When the cylinders are rotated bodily about the axis the pressures in the cylinders are influenced by centrifugal action, and increase with increasing radial distance from the axis. The new pressures consist of the pressure $p_0$ which is equal in both cylinders, and a pressure increment $p_z$ which is caused by centrifugal action, and varies with the radial distance. If the above condition that the ratio of forces should be a constant, is to be fulfilled notwithstanding the influence of centrifugal action, the following equation must be satisfied:

$$\frac{p_o F_1 + \int F_1 p_z dF_1}{p_o F_2 + \int F_2 p_z dF_2} = \frac{P_{pol} + P_{z1}}{P_{po2} + P_{z2}} = \frac{P_1}{P_2} = c_1.$$

This is the case if $$P_{z1} = c_1 P_{z2}.$$

$P_{z1}$ and $P_{z2}$ are functions of $R_1$ and $R_2$, $d_1$ and $d_2$, and $n$. $n$ is eliminated as it is the same for both cylinders. There remains only a relation between $R_1$, $R_2$ and $d_1$, $d_2$.

The equation may also be written briefly as follows:

$$\frac{p_o F_1 + \int F_1 p_z dF_1}{p_o F_2 + \int F_2 p_z dF_2} = \frac{P_1}{P_2} = c_1$$

and the condition to be derived therefrom would then read:

$$\frac{\int F_1 p_z (dF_1)}{\int F_2 p_z (dF_2)} = c_1.$$

In the above calculation, it had been assumed that the centrifugal force Z acting on the tangential piston 5 is at right angles to its stroke. If this is not so, as shown in Fig. 5, a component $P_{zk}$ of the centrifugal force must be balanced. For a constant ratio $c_1$, the following equation applies:

$$P_{z1} + P_{zk} = c_1 P_{z2}.$$

$P_{zk}$ is a function of the number of revs. $n$ under the same conditions as $P_{z2}$ so that again, as above, there is only one relation between the weight, radial distance, and diameter of pistons.

In a similar manner the influence of centrifugal action may be eliminated in the existing hydraulic measuring instruments having tangential cylinders only. Referring to Fig. 6, the piston 17 in the cylinder 18 is given such a position, for instance by varying the direction in which it is displaced, that the component $P_{zk}$ of the centrifugal action in the direction in which the piston is displaced, is at a ratio as defined above to the incremental force $P_{s1}$.

We wish it to be understood that we do not desire to be limited to the exact details of construction shown and described, for obvious modifications will occur to a person skilled in the art.

We claim:

1. A torque-measuring instrument comprising a driving and a driven shaft, a cylinder arranged tangentially with respect to the axis of revolution of said shafts, means connected with said driving shaft for generating forces in a body of liquid in said cylinder, a cylinder arranged in parallel to the axis of revolution of said shafts, a liquid connection between said cylinders, and means for measuring the forces generated in a body of liquid in said parallel cylinder by the forces in said tangential cylinder.

2. In a torque-measuring device, the combination of tangentially arranged cylinders filled with liquid and pistons adapted to slide in the cylinders, with axial cylinders provided with pistons adapted to operate a measuring device, the cylinders being arranged externally of the axis of the shaft and provided with fluid connecting means between them.

3. In a torque-measuring device according to claim 2, the combination of tangentially arranged cylinders filled with liquid and pistons adapted to slide in the cylinders, with axial cylinders arranged externally of the axis of the shaft and connected to the pistons, adapted to operate a measuring device, fluid connecting means between said cylinders, the distance from the axis of the shaft to the axial cylinders being such that the pressures exerted on the pistons of the tangential cylinders by the centrifugal forces of the liquid are equalized by the pressures exerted on the pistons of the axial cylinders by the centrifugal forces of the liquid.

4. In a torque-measuring device, the combination of tangentially arranged cylinders filled with liquid and pistons adapted to slide in the cylinders, said pistons being inclined to the direction of displacement, with axial cylinders arranged externally of the axis of the shaft and connected therewith, fluid connecting means between said cylinders, pistons in said axial cylinders being adapted to operate a measuring device, the distance of the axial cylinders from the axis of said shaft being such that centrifugal forces exerted on the tangential piston in the direction of displacement are equalized.

5. An instrument for measuring torque comprising a hydraulic device, a cylinder arranged tangentially, and a cylinder arranged in parallel to the axis of revolution of said device, a given distance of said tangential cylinder from said axis corresponding to a definite distance of said parallel cylinder from said axis.

6. An instrument for measuring torque comprising a hydraulic device having a cylinder arranged tangentially, and a cylinder arranged in parallel to the axis of revolution of said device adapted to balance the centrifugal action on the liquid in said device by the centrifugal action of one of said pistons.

7. In a torque-measuring instrument the combination with a fluid filled, tangentially arranged cylinder and pistons displaceable therein serving as shaft coupling, of axial cylinders arranged outside of the center of said shafts, a suitable pipe connection between the tangential and axial cylinders, and pistons in the axial cylinders adapted to actuate a measuring device.

8. A torque-measuring instrument in accordance with claim 11, in which the tangential cylinders are so arranged that the directions of displacement of the pistons are at right angles to the respective connecting lines of the centers of gravity of the pistons with the center of the shaft, and that to a certain shaft distance of the tangential cylinders, a distance of the shafts of the axial cylinders is determined in accordance with the ratio of the diameters of the tangential and axial cylinders, so coordinated that the centrifugal forces acting on the fluid in the tangential and the axial cylinders balance each other.

9. A torque measuring instrument in accordance with claim 11, in which the tangential cylinders are so arranged that the directions of displacement of the pistons are positioned at an inclination with respect to the connecting lines of the piston centers of gravity with the center of the shaft, and that to a certain shaft distance of the tangential cylinders, a shaft distance of the axial cylinders is determined in accordance with the ratio of the diameters of the tangential and axial cylinders in such a manner that the centrifugal forces acting on the fluids in the axial and tangential cylinders and the centrifugal forces acting on the pistons of the tangential cylinders balance each other, as far as they are within the direction of displacement.

10. A torque measuring instrument in accordance with claim 11, in which the cylinders are so arranged that the direction of displacement of the pistons is at an inclination to the connecting lines between the centers of gravity of the pistons and the center of the shaft, and that the diameters of the axial cylinders and consequently of their fluid volume are given very small dimensions, whereby the distance of a tangential cylinder from the center of the shaft is so selected, in proportion to the inclination of the direction of displacement of the tangential piston to the connecting lines of the center of gravity of the piston with regard to the center of the shaft, that the centrifugal forces, acting on the fluid in the tangential cylinders on the one hand, and the centrifugal forces acting on the pistons of the tangential cylinders on the other hand balance each other as far as they fall within the direction of displacement.

In testimony whereof we affix our signatures.

HEINRICH EBERT.
FRITZ SEEWALD.